No. 733,948. PATENTED JULY 21, 1903.
D. DRAWBAUGH.
MAGNETO ELECTRIC MACHINE.
APPLICATION FILED MAR. 4, 1902. RENEWED JAN. 12, 1903.
NO MODEL. 2 SHEETS—SHEET 2.
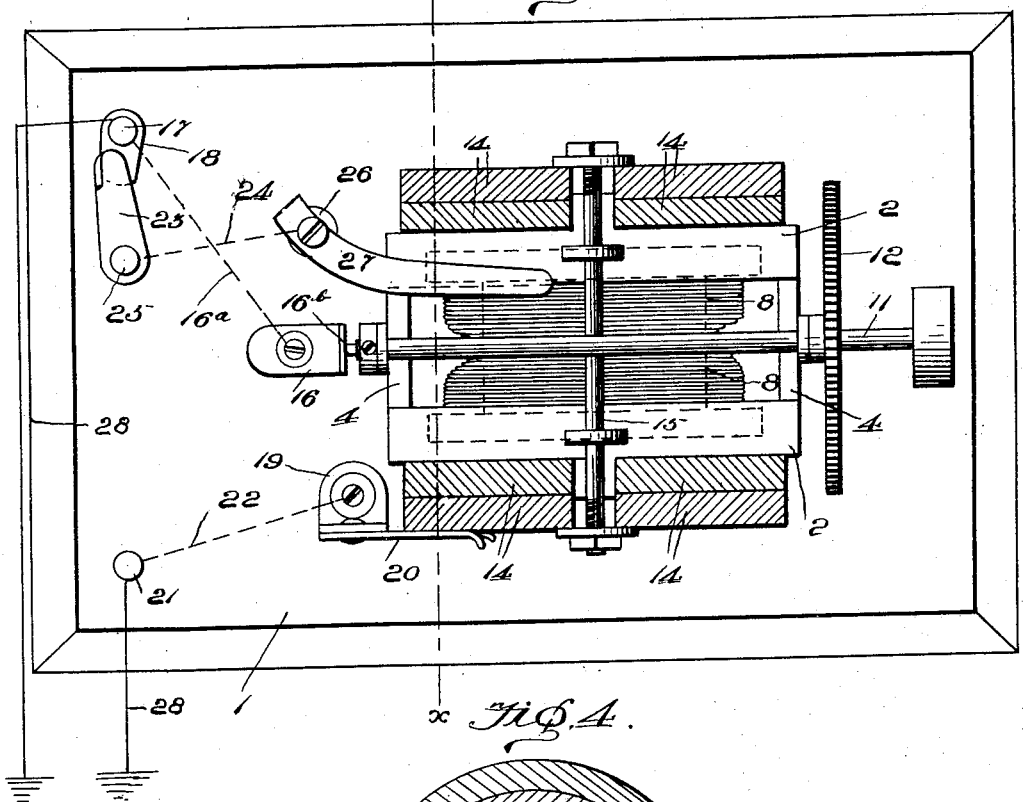
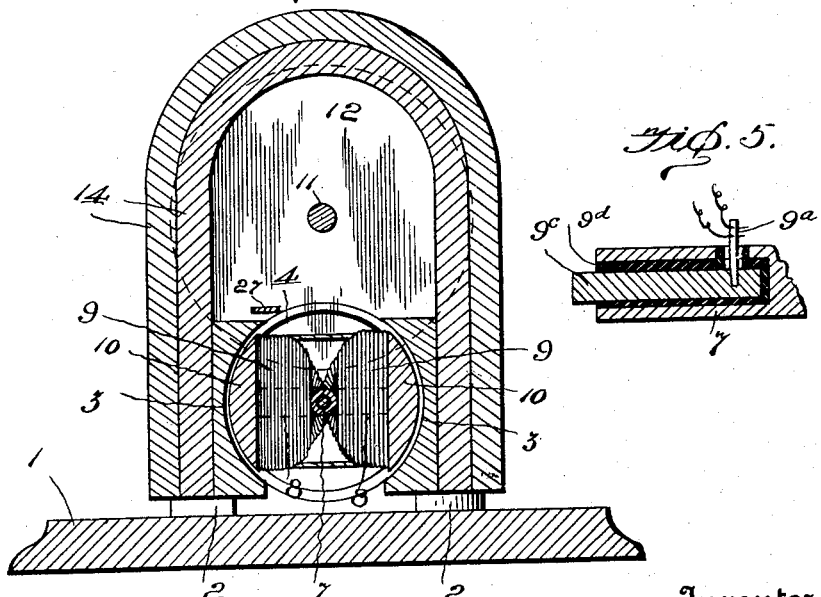
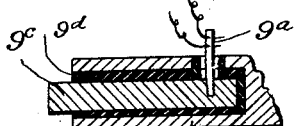
Witnesses
Bernard M. Offutt
M. W. Johnson
Inventor
Daniel Drawbaugh
by David P. Moore
Attorney No. 733,948.

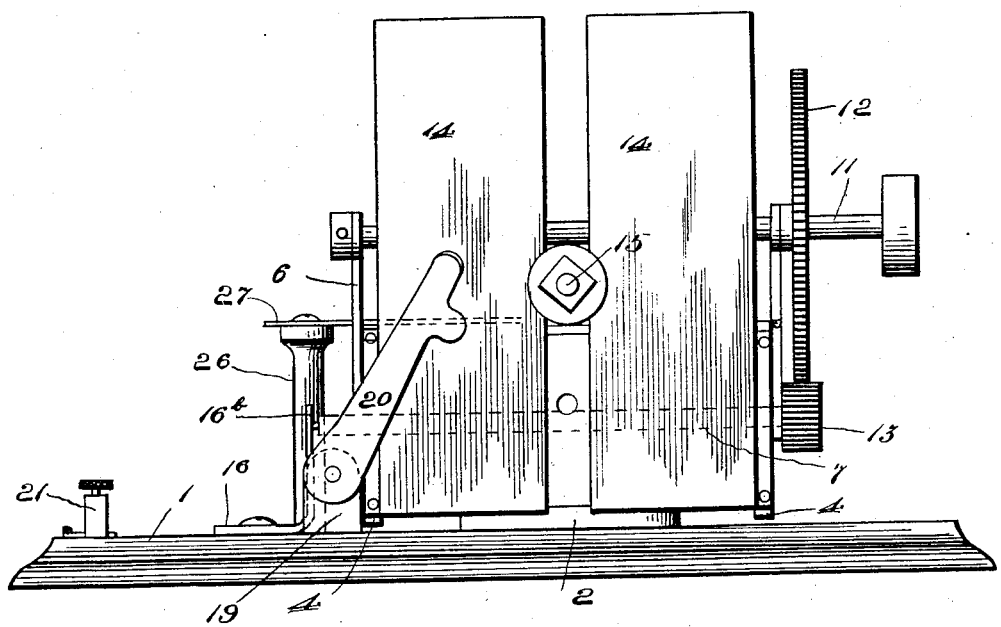
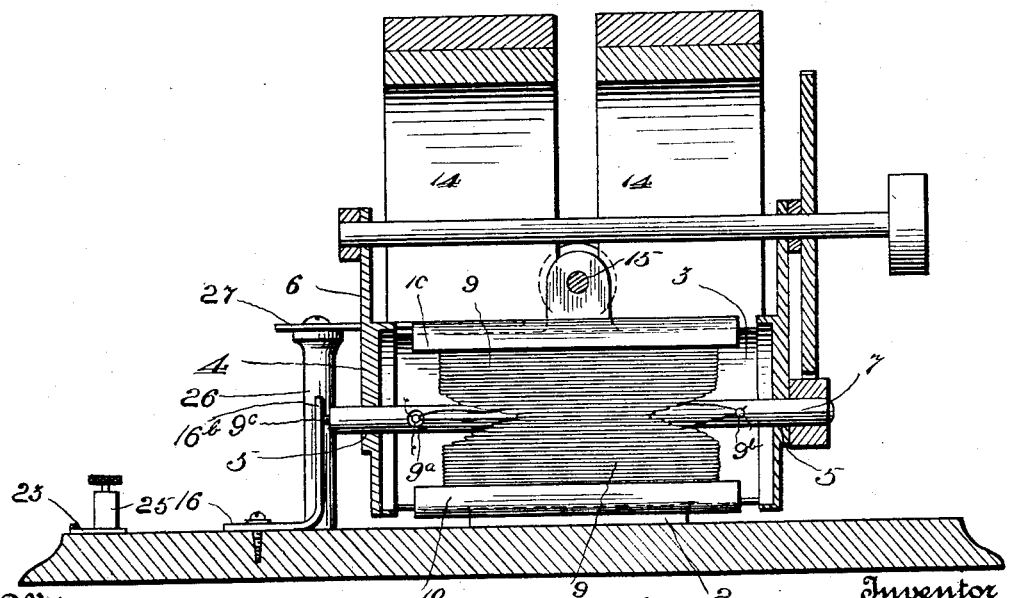

Patented July 21, 1903.

UNITED STATES PATENT OFFICE.

DANIEL DRAWBAUGH, OF EBERLYS MILL, PENNSYLVANIA.

MAGNETO-ELECTRIC MACHINE.

SPECIFICATION forming part of Letters Patent No. 733,948, dated July 21, 1903.

Application filed March 4, 1902. Renewed January 12, 1903. Serial No. 138,626. (No model.)

*To all whom it may concern:*

Be it known that I, DANIEL DRAWBAUGH, a citizen of the United States, residing at Eberlys Mill, in the county of Cumberland and State of Pennsylvania, have invented certain new and useful Improvements in Magneto-Electric Machines, of which the following is a specification.

This invention has reference to a magneto-electric machine; and the object of my invention is the provision of a device which will dispense with the Ruhmkorff and other coils and also batteries, which necessarily have to be used in connection with the coils.

To this end the invention consists of a magneto device which generates electricity of a very high potential, as is required of coils and all other induction devices, and a device which is novel in construction and combination of parts, as herein set forth.

In the accompanying drawings, Figure 1 is a side elevation of the entire mechanism. Fig. 2 is a central longitudinal section thereof. Fig. 3 is a top plan view of the device, showing its connections in dotted lines, the magnets being in section. Fig. 4 is a transverse sectional view taken on line $x$ $x$, Fig. 3. Fig. 5 is an enlarged end section of the armature-shaft.

Referring to the drawings, the magneto generator and inducer is constructed as follows: Upon the base 1 is mounted the two similar supporting-plates 2, which are provided with the inner concaved or curved walls 3. Supported by these plates, between the ends thereof, are the two circular disks 4, provided with the alined bearings 5 and the vertical arms 6. Mounted revolubly in the bearings of the disks is the shaft 7, carrying the oppositely-arranged arms 8, around which are wound the coils 9, which are connected to the shaft by means of the pins $9^a$ and $9^b$, the pin $9^a$ being connected to the short shaft $9^c$, mounted in the sleeve $9^d$ of insulation. Carried by the arms outside of the coils are the two long outwardly-curved plates 10, which are adapted to revolve within the inner walls of the supporting-plates as the shaft is revolved through the medium of the shaft 11, carrying the large gear 12, which meshes with the smaller gear 13 of the shaft 7. To revolve the shaft 11, any motive power may be employed, but more especially a high-speed motor. Straddling the device and having their ends contacted upon the outer faces of the supporting-plates are the two pairs of horseshoe-magnets 14, which are held in the proper place by means of the tie-rod 15. Secured upon the base is a rigid spring contact-plate 16, to which is connected a conductor-wire $16^a$, passing through the base and being connected to the binding-post 17, having the flat contact-plate 18 on the upper face of the base. This spring contact-plate has its free end $16^b$ in contact continuously with the inner end of the short shaft $9^c$ of the shaft 7. Mounted upon the base is also the plate 19, to which is pivotally connected the vertical switch 20, which is adapted to engage the outer face of one of the permanent magnets. Connected to the plate 19 and passing through the base to the binding-post 21 is a conductor-wire 22.

In order that the machine may be short-circuited and the desired effect attained, I employ the switch 23, which is brought into contact with the plate 18, and the wire 24, which is connected to the binding-post 25 and the vertical post or standard 26 through the medium of the flat spring-plate 27, adjustably supported upon said post, causing a short circuit to be made through this spring-plate, the post 26, the plate 18, and the armature when the curved plate 10 is at its highest point of potential. At this point the spring-plate 27 is disengaged from the plate 10, and a quick break in the short circuit is caused after the highest point of the wave has been reached.

From the foregoing description, taken in connection with the drawings, the operation of my invention is readily understood and the numerous advantages thereof are fully appreciated; but the operation, briefly stated, is as follows:

As the motive power is operated the armature is revolved and the spring-plate is caused to dip and contact the face of one of the armature-plates when the plate of the armature is over half the distance passed the spring-plate, the said spring returning to its normal position as the edge of the armature-plate passes from below.

The dipping of the spring-plate after the greater portion of each plate 10 passes below the spring-plate is caused by magnetic attraction, and as the plate 10 passes from below the plate 27 a quick break of the short circuit is made, the plates 10 at this point being out of the magnetic field. To get the desired result, the plate 27 is attracted by the upper plate 10 just as it leaves the area of the field-magnet, thus short-circuiting the armature through the spring-plate 27, wire 24, plate 23, binding-post 17, and the plate which is in contact with the armature's shaft until the plate 10 passes from beneath the plate 27, when a quick break is made in the short circuit at the last portion of the wave, thus allowing the greater or stronger portion of the current to pass through the line connections. I have experimented with this form of device and find that where a Ruhmkorff coil and batteries are used in a transmitter for wireless telegraphy my device can be substituted and answer the purpose of the spark-coil and batteries, and, in fact, in any place where induction-coils are used this device will dispense with them and their batteries, thus insuring a saving of the cost in the coils and batteries and providing a device more readily transported. I have also used this device in wireless telephony, and I find that I can establish a circuit, and for weeks after my device has been cut out of the transmitter audible sounds can be heard and understood.

What I claim as new, and desire to secure by Letters Patent, is—

1. In a magneto-electric machine, the combination of a field-magnet, an armature revolubly mounted therein, and means attracted by the armature for short-circuiting the armature as the armature passes below said means.

2. In a magneto-electric machine, the combination of a field-magnet, a revolubly-mounted armature affected thereby, and means interposed between said field and armature attracted to the armature after the same has passed its highest point.

3. In a magneto-electric machine, the combination of a field-magnet, a revolubly-mounted armature in said field, and means attracted by the armature after the same has passed nearly from below the means.

4. In a magneto-electric machine, the combination of a field-magnet, a casing carrying said magnet, an armature mounted revolubly in the casing, and means overlapping the inner edge of one side of the casing adapted to be brought into contact with the armature as one of its plates has passed over one-half its distance below the means.

5. In a magneto-electric machine, the combination of a base, two supporting-plates mounted thereon, an armature revolubly mounted between the plates, a field-magnet surrounding the plates, and a spring-plate mounted on the base and adapted to be brought into contact with the armature after the armature has had its highest point pass under the plate.

6. In a magneto-electric machine, the combination of a base, two supporting-plates mounted thereon, an armature revolubly mounted between the plates, a field-magnet surrounding the plates, and means attracted by said armature after the highest point of the armature has passed below said means.

7. In a magneto-electric machine, the combination of a base, two supporting-plates mounted thereon, a revoluble shaft carrying two oppositely-arranged arms mounted between the plates, a field-magnet surrounding the plates, and means attracted by the arms one at a time after the highest point thereof passes below said means.

8. In a magneto-electric machine, the combination of a base, two supporting-plates mounted thereon, a revoluble shaft carrying oppositely-arranged arms mounted between the plates, a field-magnet surrounding the plates, and a spring-plate mounted on the base and adapted to be attracted by one arm at a time to contact the arm after its highest point has passed below said plate.

9. In a magneto-electric machine, the combination, of a base, a field-magnet mounted thereon, a shaft carrying two arms revolubly mounted in said field-magnet, and means attracted by said arms to short-circuit the arms and also to make a quick break in the short circuit, as the arms pass below said means.

10. In a magneto-electric machine, the combination of a base, a pair of supporting-plates mounted thereon, two disks supported by said plates, a shaft revolubly mounted in said disks, a pair of oppositely-arranged arms carried by said shaft, a coil around said arms, plates carried by the arms, a field-magnet surrounding the plates, and means suspended above the supporting-plates attracted by said arms' plates after their highest point has passed below said means.

11. In a magneto-electric machine, the combination of a base, a pair of oppositely-arranged supporting-plates mounted thereon, two disks supported between said plates, a shaft mounted in said disks, arms carried by said shaft, a field-magnet surrounding the arms and supporting-plates, and means suspended above the plates adapted to be attracted by the arms one at a time, as their highest point has passed below said means.

12. In a magneto-electric machine, the combination of a pair of oppositely-arranged supporting-plates, two disks supported between said plates, a shaft mounted in said disks, arms carried by said shaft, a field-magnet surrounding the plates and arms, and a spring-plate adapted to be attracted by one arm at a time as its highest point has passed below said plate.

13. In a magneto-electric machine, the combination of a base, a field-magnet mounted thereon, a shaft carrying two arms revolubly mounted in said field-magnet, and means attracted by said arms one at a time, as their highest point has passed below the means.

14. In a magneto-electric machine, the combination of a base, a field-magnet mounted thereon, a shaft carrying two arms revolubly mounted in said field-magnet, and a spring-plate suspended above the arms adapted to be attracted by said arms one at a time after the arm has passed its highest point below the plate.

15. In a magneto-electric machine, the combination of a series of field-magnets, a casing surrounded thereby, a revoluble armature mounted in said casing, and means attracted by said armature to short-circuit the armature after the armature emerges from the magnetic field and to make a quick break in the short circuit as the armature disengages the plate.

16. In a magneto-electric machine, the combination of a series of field-magnets, a casing surrounded thereby, a revoluble armature in said casing, and a spring-plate suspended above the armature attracted by said armature after its highest point has passed below the plate.

17. In a magneto-electric machine, the combination of field-magnets, a casing surrounded thereby, a revoluble armature in said casing, a spring-plate suspended above the armature and attracted thereby as the armature has passed its highest point below the plate, and electrical connections with the magnets and the armature.

18. In a magneto-electric machine, the combination of a base, a casing mounted thereon having arms extending upward therefrom, an armature revolubly mounted in said casing, field-magnets surrounding said casing, electrical connections with the magnets and armature, means suspended above the armature adapted to be attracted thereby after the highest point of the armature has passed below the means, and means journaled in the arms of the casing for transmitting power to revolve the armature.

19. In a magneto-electric machine, the combination of a field-magnet, an armature revolubly mounted therein, and means for short-circuiting the armature after it has reached its highest point of potential.

In testimony whereof I affix my signature in presence of two witnesses.

DANIEL DRAWBAUGH.

Witnesses:
　SAMUEL D. HOLTZ,
　FRANKLIN S. HERZTER.